US012373320B1

(12) United States Patent
Ding et al.

(10) Patent No.: US 12,373,320 B1
(45) Date of Patent: Jul. 29, 2025

(54) PREDICATE EVALUATION BASED ON CPU UTILIZATION OF SHARED STORAGE

(71) Applicants: Lemon Inc., Grand Cayman (KY); Douyin Vision Co., Ltd., Beijing (CN)

(72) Inventors: Wei Ding, Los Angeles, CA (US); Jianfeng Qian, Los Angeles, CA (US); Shicai Zeng, Beijing (CN); Li Zhang, Los Angeles, CA (US); Jianjun Chen, Los Angeles, CA (US)

(73) Assignees: Lemon Inc., Grand Cayman (KY); Douyin Vision Co., Ltd., Beijing (CN)

( * ) Notice: Subject to any disclaimer, the term of this patent is extended or adjusted under 35 U.S.C. 154(b) by 0 days.

(21) Appl. No.: 18/769,172

(22) Filed: Jul. 10, 2024

(51) Int. Cl.
G06F 16/28 (2019.01)
G06F 11/30 (2006.01)

(52) U.S. Cl.
CPC ........ *G06F 11/3024* (2013.01); *G06F 16/283* (2019.01); *G06F 2201/80* (2013.01); *G06F 2201/81* (2013.01)

(58) Field of Classification Search
None
See application file for complete search history.

(56) References Cited

U.S. PATENT DOCUMENTS

| | | | |
|---|---|---|---|
| 11,048,701 B2 * | 6/2021 | Brodt | G06F 16/24542 |
| 11,061,899 B2 * | 7/2021 | Brodt | G06F 16/24542 |
| 11,789,936 B2 | 10/2023 | Chen et al. | |
| 2016/0292167 A1 * | 10/2016 | Tran | G06F 16/24542 |
| 2016/0292226 A1 * | 10/2016 | Konik | G06F 16/25 |
| 2017/0364307 A1 * | 12/2017 | Lomelino | G06F 3/0659 |
| 2019/0171650 A1 * | 6/2019 | Botev | G06F 16/2358 |
| 2023/0401236 A1 * | 12/2023 | Katsipoulakis | G06F 16/284 |
| 2024/0004897 A1 * | 1/2024 | Pandis | G06F 16/275 |
| 2024/0078237 A1 * | 3/2024 | Ma | G06F 16/24544 |
| 2024/0220499 A1 * | 7/2024 | Marathe | G06F 16/24542 |

OTHER PUBLICATIONS

Chen, J. et al., "ByteHTAP: ByteDance's HTAP System with High Data Freshness and Strong Data Consistency," Proceedings of the VLDB Endowment, vol. 15, No. 12, Aug. 2022, 14 pages.

* cited by examiner

*Primary Examiner* — Eliyah S. Harper
(74) *Attorney, Agent, or Firm* — Alleman Hall & Tuttle LLP

(57) ABSTRACT

A hybrid transactional/analytical processing (HTAP) database includes an online transaction processing (OLTP) engine, an online analytical processing (OLAP) engine provided separately from the OLTP engine, and a shared storage holding data of multiple tenants. The shared storage is configured to receive a request from the OLAP engine for evaluation of a predicate against the data stored on the shared storage. The shared storage is further configured to determine that a CPU utilization of the shared storage exceeds a predicate refusal threshold. Upon determining that the CPU utilization of the shared storage exceeds the predicate refusal threshold, the shared storage is further configured to refrain from evaluating at least a portion of the predicate.

20 Claims, 5 Drawing Sheets

PREDICATE EVALUATION BASED ON CPU UTILIZATION OF SHARED STORAGE

BACKGROUND

Databases are designed with various types of architecture. Online transaction processing (OLTP) architecture is oriented toward processing transactions. Like with a bank account, transactions tend to be simple and numerous, and may include queries such as read, insert, update, delete, etc. However, OLTP architecture lacks massively parallel processing (MPP) capability. In contrast, online analytical processing (OLAP) architecture is oriented toward processing data analysis. Queries handled by OLAP architecture tend to be more complex, involve more data, and take more time to complete. For example, OLAP architecture may be responsible for determining an average sale price over the past year of a particular product tracked by the database. Many database users have used both types of processing using the same data, and thus a hybrid transactional/analytical processing (HTAP) database has been developed which includes both types of architecture in a single database.

Predicate pushdown can be utilized as an optimization technique in a database system, including an HTAP database, to improve query performance. Predicate pushdown is a strategic approach that enables databases to work smarter by filtering data at the data source. By doing so, it reduces the amount of data transmitted and processed during query execution. Specifically, predicate pushdown focuses on optimizing the filtering aspect of queries. It applies filters to the data sources before retrieving the data, resulting in more efficient query execution.

However, in the realm of cloud-native deployment, storage may usually be shared by multiple tenants. This introduces a challenge for performance-oriented optimizations like predicate pushdown. When multiple tenants utilize the same storage nodes, high CPU utilization resulting from predicate pushdown can affect all contemporaneously incoming read and write requests. For example, if a storage node's CPU utilization remains at 100%, it may lead to frequent request timeouts. Therefore, striking a balance between the optimization benefits of predicate pushdown and potential resource contention becomes critical in such scenarios.

SUMMARY

To address these issues, a hybrid transactional/analytical processing (HTAP) database is provided herein that includes an online transaction processing (OLTP) engine, an online analytical processing (OLAP) engine provided separately from the OLTP engine, and a shared storage holding data of multiple tenants. The shared storage may be configured to receive a request from the OLAP engine for evaluation of a predicate against the data stored on the shared storage. The shared storage may be further configured to determine that a CPU utilization of the shared storage exceeds a predicate refusal threshold. The shared storage may be further configured to, upon determining that the CPU utilization of the shared storage exceeds the predicate refusal threshold, refrain from evaluating at least a portion of the predicate. The shared storage may be further configured to return a response to the request including partial or full unprocessed results from the data for predicate evaluation, and attach partial or full predicate refusal metadata to the response indicating the partial or full unprocessed results have not been evaluated.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
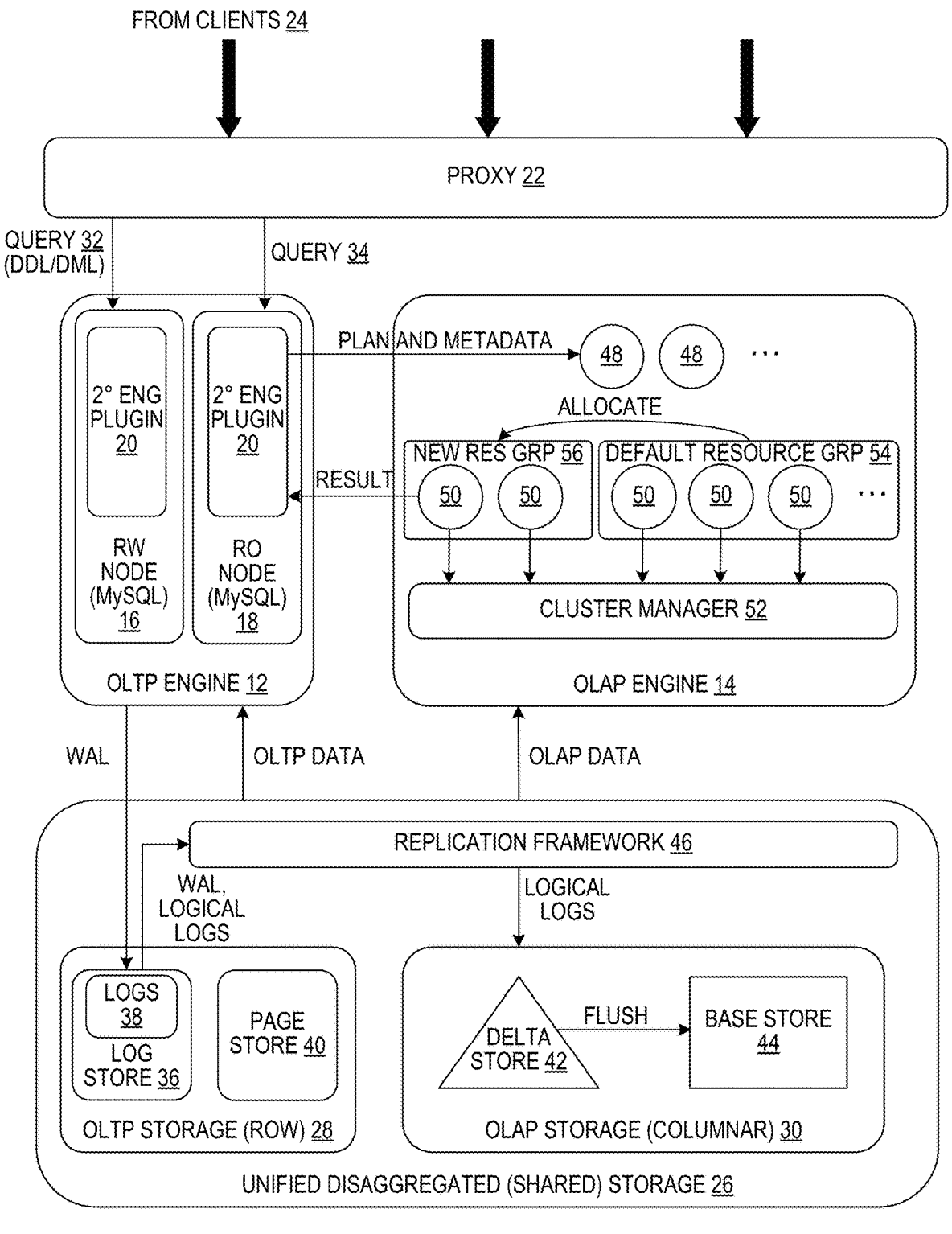
FIG. 1 illustrates a hybrid transactional/analytical processing (HTAP) database according to one example of the present disclosure.

FIG. 1 illustrates a hybrid transactional/analytical processing (HTAP) database 10 according to one example of the present disclosure. The HTAP database 10 may be hybridized in the sense that it includes both an online transaction processing (OLTP) engine 12 and an online analytical processing (OLAP) engine 14, which may be provided separately from the OLTP engine 12. That is, the HTAP database 10 may include separated compute engines. Keeping the two engines 12, 14 separate may allow each separate engine 12, 14 to exhibit peak performance for the respective workloads for which they are specialized while avoiding interference therebetween. Examples of HTAP databases with unified engines include SAP HANA and MEMSQL, and examples with separate engines include WILDFIRE and TIDB.

The OLTP engine 12 may include a read-write (RW) node 16 and a read-only (RO) node 18. Each node 16, 18 may include a respective secondary engine plugin 20, which is an extension that allows a proxy 22 to send all queries from clients 24 to the OLTP engine 12 and allow the OLTP engine 12 to determine which engine 12, 14 to use for a given query based on a variety of parameters such as query complexity. For example, data manipulation language (DML) queries and data definition language (DDL) queries may be sent only to the RW node 16, while other types of queries can be handled by either node 16, 18. By directing queries in this manner rather than at the proxy 22, the database 10 can support a read committed isolation level across both engines 12, 14, thereby guaranteeing the same results from either. For decreased latency, users may be given the option of sending queries directly to the OLAP engine 14 when the final destination is known from the start.

In contrast to the separate engines 12, 14, the HTAP database 10 may include a shared storage 26 holding data of multiple tenants. The shared storage 26 may be shared in the sense that it includes both an OLTP storage 28 holding data in row format for responding to queries of the OLTP engine 12, and an OLAP storage 30 holding data in column format for responding to queries of the OLAP engine 14. Typically, systems with separate compute engines also include separate storage, which commonly has low data freshness for OLAP queries.

The HTAP database 10 may be configured to support one unified application programming interface (API) and automatically route queries from the clients 24 to the OLTP engine 12 and OLAP engine 14 using the proxy 22. On a basic level, DML queries, DDL queries, simple queries, and queries otherwise suitable for OLTP (e.g., with predicates over indexes on OLTP tables) are included in queries 32 that are routed to the OLTP engine 12, while complex queries, such as those with multiple joins and aggregations, are included in queries 34 that are routed to the OLAP engine 14. In this manner, interference between OLTP and OLAP workloads is avoided while queries are performed by the appropriate engine 12, 14.

The OLTP storage 28 may include a log store 36 configured to persist logs 38 and a page store 40 configured to store versions of data pages and apply the logs 38 to construct current versions of the data pages. The logs 38 may include various types of logs, such as redo logs, logical logs, and write-ahead logs (WAL). The page store 40 may use redo logs to construct the data pages, while logical logs such as MYSQL binary logs for committed DML transactions may be passed on to the OLAP storage 30. The OLAP storage 30 may include a delta store 42 configured to record changes made to the OLTP storage 28, and a base store 44 configured to implement updates from the delta store 42 in persistent storage. Although the OLAP storage 30 as a whole may be columnar, it will be appreciated that the delta store 42 may store changes in row format until the changes are implemented to the base store 44 in column format. The delta store 42 may be in-memory while the base store 44 may be on-disk.

In order to ensure data freshness of the base store 44 for OLAP queries, the OLAP storage 30 may further include a replication framework 46 configured to perform log shipping of the logs 38 from the log store 36 to the delta store 42. In particular, the replication framework 46 may ship logical logs to the OLAP storage 30. The replication framework 46 may distribute the logs 38 to multiple storage nodes for each partition to build a columnar data store residing on different storage nodes from its corresponding row store.

The OLAP engine 14 may include a plurality of coordinators 48 for distributed plan generation and optimization, and a plurality of data servers 50 for distributed plan execution. A centralized cluster manager 52 may allow users to create resource groups out of the data servers 50, and may allocate data servers 50 from a default resource group 54 to a new resource group 56 as needed according to workload. For processing the query 34 at the OLAP engine 14, the secondary engine plugins 20 may generate a MYSQL-compatible query plan and perform simple optimizations before sending the partially optimized query plan, together with required metadata, to the coordinators 48 for distributed plan generation and optimization. After optimization, a co-located query scheduler may send fragment of the plan to a set of the data servers 50 for execution, which may read the data from the OLAP storage 30 and periodically send heartbeats to the cluster manager 52. The final result from the query may be buffered at one of the data servers 50 and fetched by the secondary engine plugins 20.

On a basic level, the OLTP engine 12, OLAP engine 14, and shared storage 26 may be made up of a plurality of servers working together to form a compute layer (e.g., the OLTP engine 12 and the OLAP engine 14) and a storage layer (e.g., the shared storage 26). In one example, the HTAP database 10 includes a plurality of clusters managed by the cluster manager 52, and each cluster includes six database servers, with four data servers 50 forming the OLAP engine 14 of that cluster and one RW node 16 and one RO node forming the OLTP engine 12 of that cluster. The shared storage 26 may include a plurality of storage servers, for example, three per cluster. It will be appreciated that this is merely one example and other suitable numbers of machines may be utilized.

Figure 2:
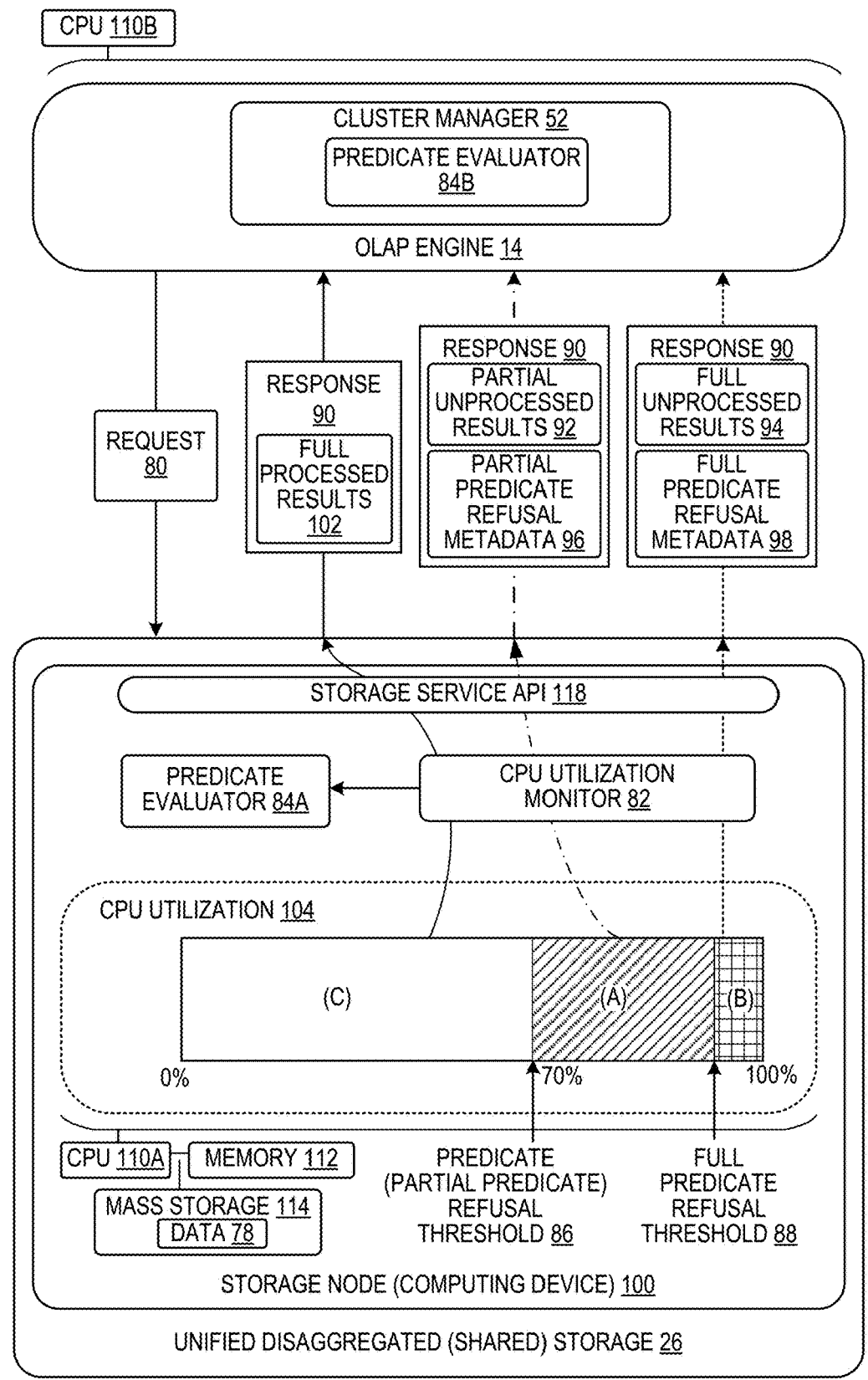
FIG. 2 illustrates a predicate operation of a shared storage of the HTAP database of FIG. 1.

FIG. 2 shows a predicate operation of the shared storage 26 of the HTAP database 10 of FIG. 1. The shared storage 26 consists of a storage node (computing device) 100 that includes a CPU 110A, memory 112, and mass storage 114. The mass storage 114 stores data 78 of multiple tenants. The shared storage 26 further includes a predicate evaluator 84A that performs evaluation of a predicate. Unnecessary data is filtered by performing the predicate. The shared storage 26 is configured to receive a request 80 from the OLAP engine 14 for evaluation of the predicate against the data 78 stored on the shared storage 26. This request (80) corresponds to "predicate pushdown," which moves the filtering process to the shared storage 26, situated close to the data source. Upon receiving the request 80, the shared storage 26 is configured to determine, via a CPU utilization monitor 82, that a CPU utilization 104 of the shared storage 26 exceeds a predicate refusal threshold 86. The CPU utilization monitor 82 monitors the CPU utilization 104 of a target storage node 100 in the shared storage 26. As depicted in FIG. 2, the CPU utilization 104 ranges from 0% (lowest utilization) to 100% (highest utilization). The predicate refusal threshold 86 is set between 0% and 100%, such as 70%. Intense CPU usage (e.g., 90-100%) often occurs due to many queries running simultaneously, especially when they involve computationally heavy tasks like applying runtime filters to columns that lack indexes.

Continuing with FIG. 2, upon determining that the CPU utilization 104 of the shared storage 26 exceeds the predicate refusal threshold 86, the shared storage 26 is configured to refrain the predicate evaluator 84A from evaluating at least a portion of the predicate. The shared storage 26 is further configured to return a response 90 to the request 80 including partial or full unprocessed results 92, 94 from the data 78 for predicate evaluation, and attach partial or full predicate refusal metadata 96, 98 to the response 90 indicating the partial or full unprocessed results 92, 94 have not been evaluated. Thus, for instance, when the predicate refusal threshold 86 is set to 70%, the shared storage 26 disables predicate evaluation (runtime filters) partially or fully once the CPU utilization 104 reaches 70%. Subsequently, when the CPU utilization 104 falls below 70% the system reenables predicate evaluation for later-arrived data. With this configuration, it is possible to control the system at a desired CPU usage, preventing CPU usage from spiking up to or near 100% and overwhelming the storage engine.

The response 90 is returned to the OLAP engine 14 that made the request 80. The OLAP engine is configured to receive the response 90 including the partial or full unprocessed results 92, 94 from the data 78 for predicate evaluation and the partial or full predicate refusal metadata 96, 98, and determine that at least the portion of the predicate has not been evaluated based on the partial or full predicate refusal metadata 96, 98. The OLAP engine is further configured to evaluate, via a predicate evaluator 84B, the predicate using the partial or full unprocessed results 92, 94 received in the response 90. The partial or full predicate refusal metadata 96, 98 may be linked to every batch of the return data to indicate that predicate evaluation should happen at the OLAP engine 14, i.e., the compute node (server) executing the OLAP engine. This ensures that the OLAP engine 14 (or compute node or server executing the OLAP engine 14) evaluates the predicate as early as possible to provide correct final results.

Detailed operations of generating the response 90 based on the CPU utilization 104 at the shared storage 26, along with scenarios/ranges (A), (B), and (C) are discussed below.

In scenario/range (A), the predicate refusal threshold 86 is a partial predicate refusal threshold, and the share storage 26 further determines a full predicate refusal threshold 88 that is higher than the partial predicate refusal threshold 86. The full predicate refusal threshold 88 may be closer to 100%. The shared storage 26 is further configured to determine that the CPU utilization 104 of the shared storage 26 exceeds the partial predicate refusal threshold 86 but does not reach the full predicate refusal threshold 88, in which the CPU utilization 104 falls within the range of (A). Upon determining that the CPU utilization 104 of the shared storage 26 exceeds the partial predicate refusal threshold 86 but does not reach the full predicate refusal threshold 88, the shared storage 26 is configured to refrain from the predicate evaluator 84A evaluating a portion of the predicate. The shared storage 26 is further configured to return the response 90 to the request 80 including the partial unprocessed results 92 from the data 78 for predicate evaluation, and attach the partial predicate refusal metadata 96 to the response 90 indicating the portion of the predicate has not been evaluated. The response 90 is returned to the OLAP engine 14, and the OLAP engine 14 is configured to receive the response 90 including the partial unprocessed results 92 from the data 78 for predicate evaluation and the partial predicate refusal metadata 96. The OLAP engine 14 is further configured to determine that the portion of the predicate has not been evaluated based on the partial predicate refusal metadata 96, and evaluate, via the predicate evaluator 84B, the predicate using the partial unprocessed results 92 received in the response 90.

In scenario/range (B), the shared storage 26 is further configured to determine that the CPU utilization 104 of the shared storage 26 reaches the full predicate refusal threshold 88, in which the CPU utilization 104 falls within the range of (B). Upon determining that the CPU utilization 104 of the shared storage 26 reaches the full predicate refusal threshold 88, the shared storage 26 is configured to refrain the predicate evaluator 84A from evaluating the predicate. The shared storage 26 is further configured to return the response 90 to the request 80 including the full unprocessed results 94 from the data 78 for predicate evaluation, and attach the full predicate refusal metadata 98 to the response 90 indicating the predicate has not been evaluated. The response 90 is returned to the OLAP engine 14, and the OLAP engine 14 is configured to receive the response 90 including the full unprocessed results 94 from the data 78 for predicate evaluation and the full predicate refusal metadata 98. The OLAP engine 14 is further configured to determine that the predicate has not been evaluated based on the full predicate refusal metadata 98, and evaluate, via the predicate evaluator 84B, the predicate using the full unprocessed results 94 received in the response 90.

Finally, in scenario/range (C), the shared storage 26 is further configured to determine that the CPU utilization 104 of the shared storage 26 does not exceed the predicate refusal threshold 86, in which the CPU utilization 104 falls within the range of (C). Upon determining that the CPU utilization 104 of the shared storage 26 does not exceed the predicate refusal threshold 86, the shared storage 26 is further configured to evaluate the predicate at the shared storage 26, and return the response 90 to the request 80 including full processed results 102 from the data 78 for predicate evaluation. The response 90 is returned to the OLAP engine 14 for further processing.

Figure 3A:
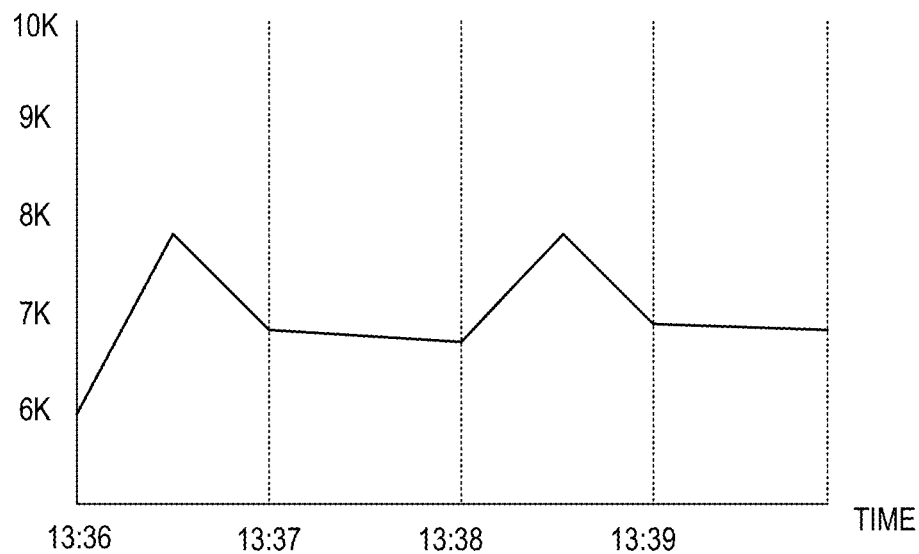
FIG. 3A illustrates an experiment result with a query workload without predicate evaluation based on CPU utilization.
Figure 3B:
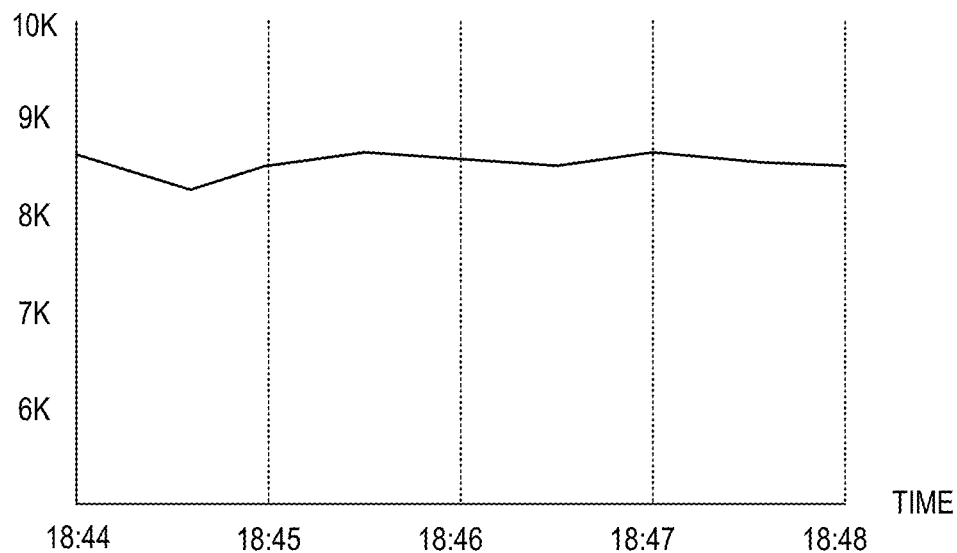
FIG. 3B illustrates an experimental result with a query workload through predicate evaluation performed based on CPU utilization according to the present disclosure.

FIG. 3A illustrates an experiment result with a query workload without predicate evaluation based on CPU utilization. FIG. 3B illustrates an experimental result with a query workload through predicate evaluation performed based on CPU utilization according to the present disclosure. As shown in FIG. 3A, queries per second (QPS) fluctuates between 6K and 8K. In this case, executing the workload in the absence of the predicate evaluation based on CPU utilization leads to storage overload, resulting in significant variability in QPS. In contrast, as shown in FIG. 3B, with predicate evaluation based on CPU utilization, the QPS ranges between 8K and 8.8K, and the average QPS is about 20% higher and exhibits less QPS variation compared to the QPS in FIG. 3A. This improvement is because the system ensures sufficient CPU resources are reallocated to the second set of queries, thereby increasing the overall QPS. These experiments highlight the effectiveness of the present disclosure in maintaining query performance isolation, particularly in scenarios of CPU overload.

Figure 4:
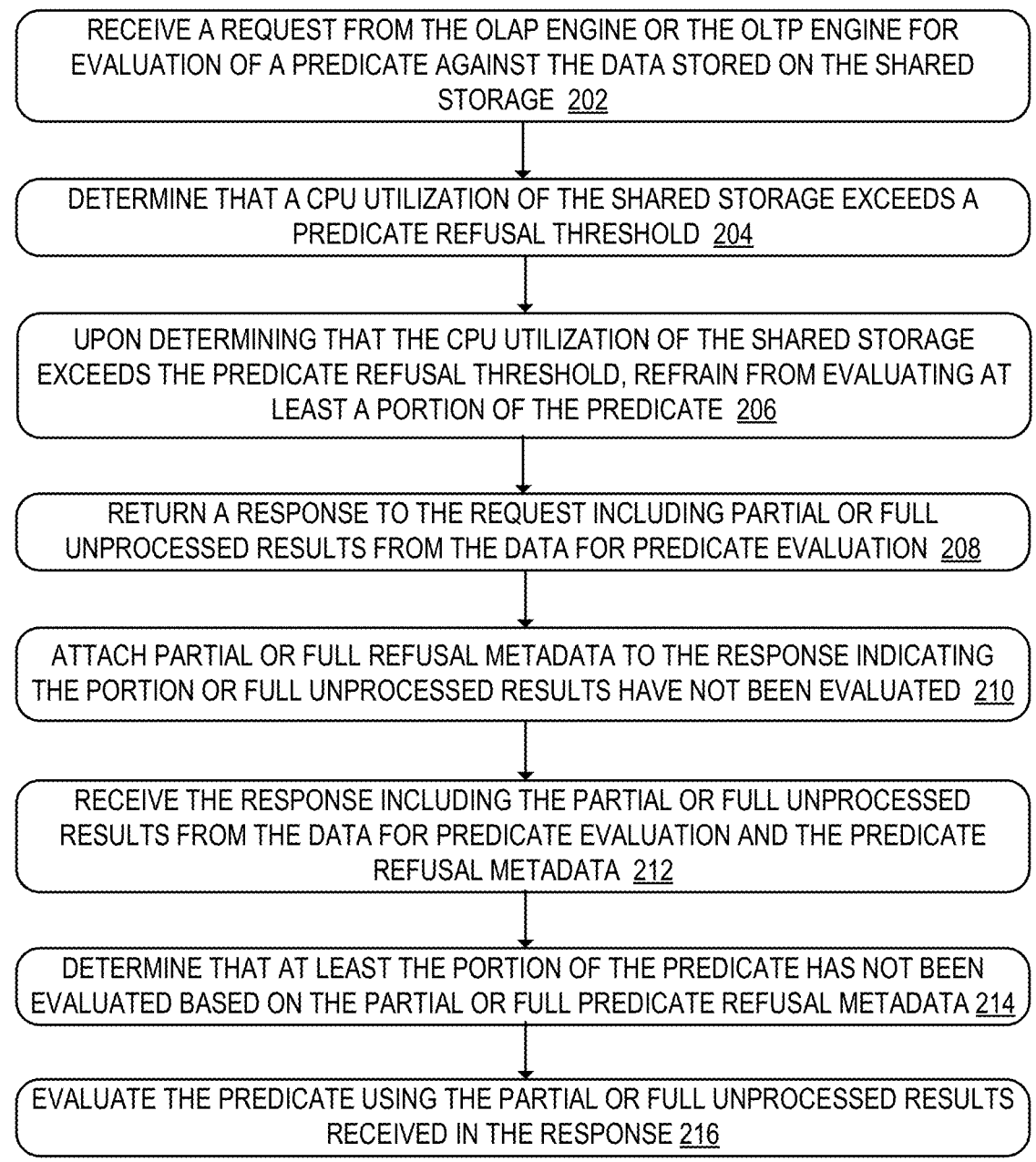
FIG. 4 shows an example flowchart of a method for evaluating predicate at the shared storage in an HTAP database according to one example of the present disclosure.

FIG. 4 shows a flowchart for a data processing method 200 for a hybrid transactional/analytical processing (HTAP) database according to the present disclosure. The method 200 may be implemented by the HTAP database 10 illustrated in FIG. 1, and performed at the shared storage 26. Thus, the HTAP database may include an online transaction processing (OLTP) engine, an online analytical processing (OLAP) engine provided separately from the OLTP engine, and a shared storage holding data of multiple tenants.

The following steps 202, 204, 206, 208, and 210 are performed at the shared storage. At 202, the method 200 may include receiving a request from the OLAP engine for evaluation of a predicate against the data stored on the shared storage. At 204, the method 200 may include determining that a CPU utilization of the shared storage exceeds a predicate refusal threshold. At 206, the method 200 may include, upon determining that the CPU utilization of the shared storage exceeds the predicate refusal threshold, refraining from evaluating at least a portion of the predicate. At 208, the method 200 may include returning a response to the request including partial or full unprocessed results from the data for predicate evaluation. At 210, the method 200 may include attaching predicate refusal metadata to the response indicating the partial or full unprocessed results have not been evaluated. Furthermore, the following steps 212, 214, and 216 are performed at the OLAP engine. At 212, the method 200 may include receiving the response including the partial or full unprocessed results from the data for predicate evaluation and the predicate refusal metadata. At 214, the method 200 may include determining that at least the portion of the predicate has not been evaluated based on the predicate refusal metadata. At 216, the method 200 may include evaluating the predicate using the partial or full unprocessed results received in the response.

The systems and methods disclosed herein provides a hybrid database that is able to maintain system stability and quality of service (QOS) for shared storage. This is achieved through an adaptive predicate pushdown mechanism, where the storage node of the shared storage evaluates a predicate based on CPU utilization, and return the response including partial or full unprocessed results and partial or full predicate refusal metadata to the OLAP engine. Consequently, the shared storage engine benefits from having more available CPU cycles. This extra capacity can be assigned to other tasks happening at the same time, making them run faster and leading to an overall improved processing rate.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
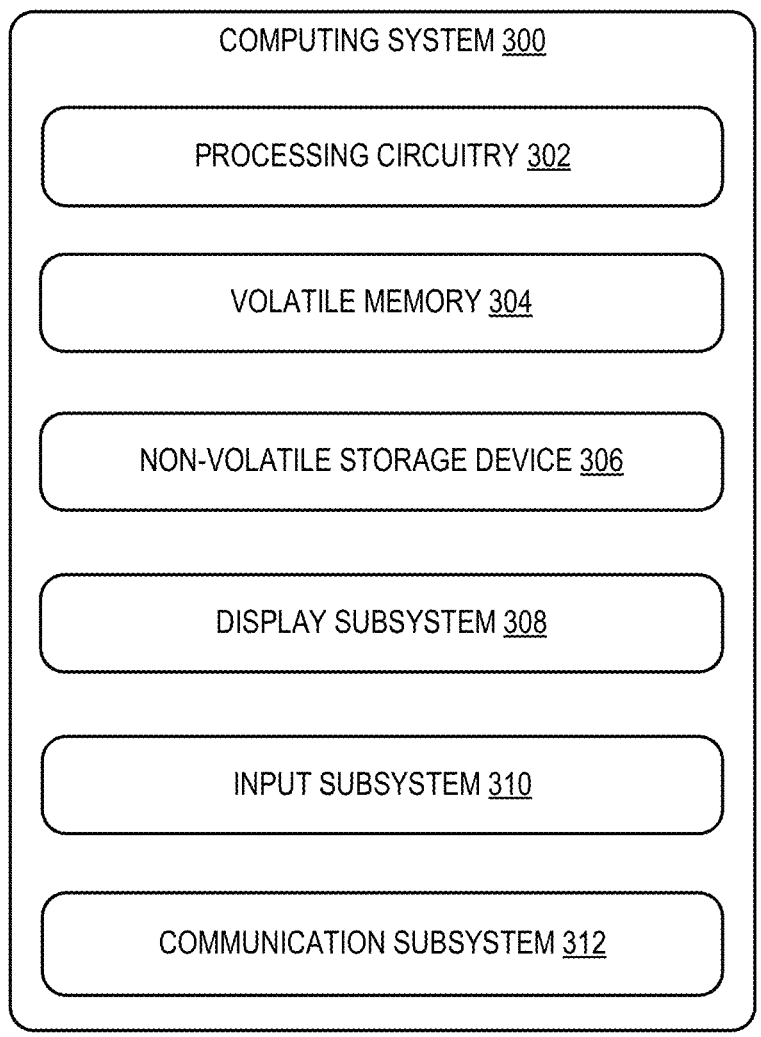
FIG. 5 shows a schematic view of an example computing environment in which the HTAP database of FIG. 1 may be enacted.

FIG. 5 schematically shows a non-limiting embodiment of a computing system 300 that can enact one or more of the methods and processes described above. Computing system 300 is shown in simplified form. Computing system 300 may embody the HTAP database 10 described above and illustrated in FIG. 2. Computing system 300 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 300 includes a logic processor 302 volatile memory 304, and a non-volatile storage device 306. Computing system 300 may optionally include a display subsystem 308, input subsystem 310, communication subsystem 312, and/or other components not shown in FIG. 5.

Logic processor 302 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 302 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 306 includes one or more physical devices configured to hold instructions executable by the logic processors to implement the methods and processes described herein. When such methods and processes are implemented, the state of non-volatile storage device 306 may be transformed—e.g., to hold different data.

Non-volatile storage device 306 may include physical devices that are removable and/or built-in. Non-volatile storage device 306 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 306 may include nonvolatile, dynamic, static, read/write, read-only, sequential-access, location-addressable, file-addressable, and/or content-addressable devices. It will be appreciated that non-volatile storage device 306 is configured to hold instructions even when power is cut to the non-volatile storage device 306.

Volatile memory 304 may include physical devices that include random access memory. Volatile memory 304 is typically utilized by logic processor 302 to temporarily store information during processing of software instructions. It will be appreciated that volatile memory 304 typically does not continue to store instructions when power is cut to the volatile memory 304.

Aspects of logic processor 302, volatile memory 304, and non-volatile storage device 306 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 300 typically implemented in software by a processor to perform a particular function using portions of volatile memory, which function involves transformative processing that specially configures the processor to perform the function. Thus, a module, program, or engine may be instantiated via logic processor 302 executing instructions held by non-volatile storage device 306, using portions of volatile memory 304. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 308 may be used to present a visual representation of data held by non-volatile storage device 306. The visual representation may take the form of a graphical user interface (GUI). As the herein described methods and processes change the data held by the non-volatile storage device, and thus transform the state of the non-volatile storage device, the state of display subsystem 308 may likewise be transformed to visually represent changes in the underlying data. Display subsystem 308 may include one or more display devices utilizing virtually any type of technology. Such display devices may be combined with logic processor 302, volatile memory 304, and/or non-volatile storage device 306 in a shared enclosure, or such display devices may be peripheral display devices.

When included, input subsystem 310 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 312 may be configured to communicatively couple various computing devices described herein with each other, and with other devices. Communication subsystem 312 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 300 to send and/or receive messages to and/or from other devices via a network such as the Internet.

The following paragraphs provide additional description of the subject matter of the present disclosure. One aspect provides a hybrid transactional/analytical processing (HTAP) database comprising an online transaction processing (OLTP) engine, an online analytical processing (OLAP) engine provided separately from the OLTP engine, and a shared storage holding data of multiple tenants. The shared storage is configured to receive a request from the OLAP engine for evaluation of a predicate against the data stored on the shared storage. The shared storage is further configured to determine that a CPU utilization of the shared storage exceeds a predicate refusal threshold. The shared storage is further configured to, upon determining that the CPU utilization of the shared storage exceeds the predicate refusal threshold, refrain from evaluating at least a portion of the predicate.

In this aspect, the shared storage is further configured to return a response to the request including partial or full unprocessed results from the data for predicate evaluation, and attach partial or full predicate refusal metadata to the response indicating the partial or full unprocessed results have not been evaluated.

In this aspect, the OLAP engine is configured to receive the response including the partial or full unprocessed results from the data for predicate evaluation and the partial or full predicate refusal metadata. The OLAP engine is further configured to determine that at least the portion of the predicate has not been evaluated based on the partial or full predicate refusal metadata. The OLAP engine is further configured to evaluate the predicate using the partial or full unprocessed results received in the response.

In this aspect, the predicate refusal threshold may be a partial predicate refusal threshold. The share storage may further determine a full predicate refusal threshold that is higher than the partial predicate refusal threshold. The shared storage is further configured to determine that the CPU utilization of the shared storage exceeds the partial predicate refusal threshold but does not reach the full predicate refusal threshold. The shared storage is further configured to, upon determining that the CPU utilization of the shared storage exceeds the partial predicate refusal threshold but does not reach the full predicate refusal threshold, refrain from evaluating a portion of the predicate. The shared storage is further configured to return a response to the request including partial unprocessed results from the data for predicate evaluation, and attach partial predicate refusal metadata to the response indicating the portion of the predicate has not been evaluated.

In this aspect, the OLAP engine is configured to receive the response including the partial unprocessed results from the data for predicate evaluation and the partial predicate refusal metadata. The OLAP engine is further configured to determine that the portion of the predicate has not been evaluated based on the partial predicate refusal metadata, and evaluate the predicate using the partial unprocessed results received in the response.

In this aspect, the predicate refusal threshold may be a partial predicate refusal threshold. The share storage may further determine a full predicate refusal threshold that is higher than the partial predicate refusal threshold. The shared storage is further configured to determine that the CPU utilization of the shared storage reaches the full predicate refusal threshold. The shared storage is further configured to, upon determining that the CPU utilization of the shared storage reaches the full predicate refusal threshold, refrain from evaluating the predicate. The shared storage is further configured to return a response to the request including full unprocessed results from the data for predicate evaluation. The shared storage is further configured to attach full predicate refusal metadata to the response indicating the predicate has not been evaluated.

In this aspect, the OLAP engine is configured to receive the response including the full unprocessed results from the data for predicate evaluation and the full predicate refusal metadata. The OLAP engine is further configured to determine that the predicate has not been evaluated based on the full predicate refusal metadata, and evaluate the predicate using the full unprocessed results received in the response.

In this aspect, the shared storage is further configured to determine that the CPU utilization of the shared storage does not exceed the predicate refusal threshold. The shared storage is further configured to, upon determining that the CPU utilization of the shared storage does not exceed the predicate refusal threshold, evaluate the predicate at the shared storage, and return a response to the request including full processed results from the data for predicate evaluation.

Another aspect provides a data processing method for a hybrid transactional/analytical processing (HTAP) database including an online transaction processing (OLTP) engine, an online analytical processing (OLAP) engine provided separately from the OLTP engine, and a shared storage holding data of multiple tenants. The method comprises, at the shared storage, receiving a request from the OLAP engine for evaluation of a predicate against the data stored on the shared storage, determining that a CPU utilization of the shared storage exceeds a predicate refusal threshold, and upon determining that the CPU utilization of the shared storage exceeds the predicate refusal threshold, refraining from evaluating at least a portion of the predicate.

In this aspect, the data processing method may further comprise, at the shared storage, returning a response to the request including partial or full unprocessed results from the data for predicate evaluation, and attaching partial or full predicate refusal metadata to the response indicating the partial or full unprocessed results have not been evaluated.

In this aspect, the data processing method may further comprise, at the OLAP engine, receiving the response including the partial or full unprocessed results from the data for predicate evaluation and the partial or full predicate refusal metadata, determining that at least the portion of the predicate has not been evaluated based on the partial or full predicate refusal metadata, and evaluating the predicate using the partial or full unprocessed results received in the response.

In this aspect, the predicate refusal threshold may be a partial predicate refusal threshold. The share storage may further determine a full predicate refusal threshold that is higher than the partial predicate refusal threshold. The method may further comprise, at the shared storage, determining that the CPU utilization of the shared storage exceeds the partial predicate refusal threshold but does not reach the full predicate refusal threshold, upon determining that the CPU utilization of the shared storage exceeds the partial predicate refusal threshold but does not reach the full predicate refusal threshold, refraining from evaluating a portion of the predicate, returning a response to the request including partial unprocessed results from the data for predicate evaluation, and attaching partial predicate refusal metadata to the response indicating the portion of the predicate has not been evaluated.

In this aspect, the data processing method may further comprise, at the OLAP engine, receiving the response including the partial unprocessed results from the data for predicate evaluation and the partial predicate refusal metadata, determining that the portion of the predicate has not been evaluated based on the partial predicate refusal metadata, and evaluating the predicate using the partial unprocessed results received in the response.

In this aspect, the predicate refusal threshold may be a partial predicate refusal threshold. The share storage may further determine a full predicate refusal threshold that is higher than the partial predicate refusal threshold. The method may further comprise, at the shared storage, determining that the CPU utilization of the shared storage reaches the full predicate refusal threshold, upon determining that the CPU utilization of the shared storage reaches the full predicate refusal threshold, refraining from evaluating the predicate, returning a response to the request including full unprocessed results from the data for predicate evaluation, and attaching full predicate refusal metadata to the response indicating the predicate has not been evaluated.

In this aspect, the data processing method may further comprise, at the OLAP engine, receiving the response including the full unprocessed results from the data for predicate evaluation and the full predicate refusal metadata, determining that the predicate has not been evaluated based on the full predicate refusal metadata, and evaluating the predicate using the full unprocessed results received in the response.

In this aspect, the data processing method may further comprise, at the shared storage, determining that the CPU utilization of the shared storage does not exceed the predicate refusal threshold, upon determining that the CPU utilization of the shared storage does not exceed the predicate refusal threshold, evaluating the predicate at the shared storage, and returning a response to the request including full processed results from the data for predicate evaluation.

Another aspect provides a hybrid transactional/analytical processing (HTAP) database comprising an online transaction processing (OLTP) engine, an online analytical processing (OLAP) engine provided separately from the OLTP engine, and a shared storage holding data of multiple tenants. The shared storage is configured to receive a first request from the OLAP engine for evaluation of a first predicate against the data stored on the shared storage, determine that the CPU utilization of the shared storage exceeds the predicate refusal threshold but does not reach full predicate refusal threshold for the first request, and upon determining that the CPU utilization of the shared storage exceeds the predicate refusal threshold but does not reach the full predicate refusal threshold, refrain from evaluating a portion of the first predicate. The shared storage is further configured to receive a second request from the OLAP engine for evaluation of a second predicate against the data stored on the shared storage, determine that the CPU utilization of the shared storage reaches the full predicate refusal threshold, and upon determining that the CPU utilization of the shared storage reaches the full predicate refusal threshold, refrain from evaluating the second predicate.

In this aspect, the shared storage is further configured to, upon determining that the CPU utilization of the shared storage exceeds the predicate refusal threshold but does not reach the full predicate refusal threshold for the first request, return a first response to the first request including the partial unprocessed results from the data for predicate evaluation, and attach a first metadata to the first response indicating the portion of the predicate has not been evaluated. the shared storage is further configured to, upon determining that the CPU utilization of the shared storage reaches the full predicate refusal threshold, return a second response to the second request including full unprocessed results from the data for predicate evaluation, and attach a second metadata to the second response indicating the predicate has not been evaluated.

In this aspect, the OLAP engine is configured to receive the first or second response including the partial unprocessed results or the full unprocessed results from the data for predicate evaluation and the first or second metadata, and evaluate the first or second predicate using the partial unprocessed results or the full unprocessed results received in the first or second response.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A hybrid transactional/analytical processing (HTAP) database, comprising:
   an online transaction processing (OLTP) engine;
   an online analytical processing (OLAP) engine provided separately from the OLTP engine; and
   a shared storage holding data of multiple tenants, wherein the shared storage is configured to:
   receive a request from the OLAP engine for evaluation of a predicate against the data stored on the shared storage;
   determine that a CPU utilization of the shared storage exceeds a predicate refusal threshold; and
   upon determining that the CPU utilization of the shared storage exceeds the predicate refusal threshold, refrain from evaluating at least a portion of the predicate.

2. The HTAP database of claim 1, wherein the shared storage is further configured to:

return a response to the request including partial or full unprocessed results from the data for predicate evaluation; and attach partial or full predicate refusal metadata to the response indicating the partial or full unprocessed results have not been evaluated.

3. The HTAP database of claim 2, wherein the OLAP engine is configured to:

receive the response including the partial or full unprocessed results from the data for predicate evaluation and the partial or full predicate refusal metadata;

determine that at least the portion of the predicate has not been evaluated based on the partial or full predicate refusal metadata; and evaluate the predicate using the partial or full unprocessed results received in the response.

4. The HTAP database of claim 1, wherein
the predicate refusal threshold is a partial predicate refusal threshold,
the share storage further determines a full predicate refusal threshold that is higher than the partial predicate refusal threshold, and
the shared storage is further configured to:
determine that the CPU utilization of the shared storage exceeds the partial predicate refusal threshold but does not reach the full predicate refusal threshold;
upon determining that the CPU utilization of the shared storage exceeds the partial predicate refusal threshold but does not reach the full predicate refusal threshold, refrain from evaluating a portion of the predicate;
return a response to the request including partial unprocessed results from the data for predicate evaluation; and
attach partial predicate refusal metadata to the response indicating the portion of the predicate has not been evaluated.

5. The HTAP database of claim 4, wherein the OLAP engine is configured to:
receive the response including the partial unprocessed results from the data for predicate evaluation and the partial predicate refusal metadata;
determine that the portion of the predicate has not been evaluated based on the partial predicate refusal metadata; and
evaluate the predicate using the partial unprocessed results received in the response.

6. The HTAP database of claim 1, wherein
the predicate refusal threshold is a partial predicate refusal threshold,
the share storage further determines a full predicate refusal threshold that is higher than the partial predicate refusal threshold, and
the shared storage is further configured to:
determine that the CPU utilization of the shared storage reaches the full predicate refusal threshold;
upon determining that the CPU utilization of the shared storage reaches the full predicate refusal threshold, refrain from evaluating the predicate;
return a response to the request including full unprocessed results from the data for predicate evaluation; and
attach full predicate refusal metadata to the response indicating the predicate has not been evaluated.

7. The HTAP database of claim 6, wherein the OLAP engine is configured to:

receive the response including the full unprocessed results from the data for predicate evaluation and the full predicate refusal metadata;
determine that the predicate has not been evaluated based on the full predicate refusal metadata; and
evaluate the predicate using the full unprocessed results received in the response.

8. The HTAP database of claim 1, wherein the shared storage is further configured to:
determine that the CPU utilization of the shared storage does not exceed the predicate refusal threshold;
upon determining that the CPU utilization of the shared storage does not exceed the predicate refusal threshold, evaluate the predicate at the shared storage; and
return a response to the request including full processed results from the data for predicate evaluation.

9. A data processing method for a hybrid transactional/analytical processing (HTAP) database including an online transaction processing (OLTP) engine, an online analytical processing (OLAP) engine provided separately from the OLTP engine, and a shared storage holding data of multiple tenants, the method comprising, at the shared storage:
receiving a request from the OLAP engine for evaluation of a predicate against the data stored on the shared storage;
determining that a CPU utilization of the shared storage exceeds a predicate refusal threshold; and
upon determining that the CPU utilization of the shared storage exceeds the predicate refusal threshold, refraining from evaluating at least a portion of the predicate.

10. The data processing method of claim 9, further comprising, at the shared storage:
returning a response to the request including partial or full unprocessed results from the data for predicate evaluation; and
attaching partial or full predicate refusal metadata to the response indicating the partial or full unprocessed results have not been evaluated.

11. The data processing method of claim 10, further comprising, at the OLAP engine:
receiving the response including the partial or full unprocessed results from the data for predicate evaluation and the partial or full predicate refusal metadata;
determining that at least the portion of the predicate has not been evaluated based on the partial or full predicate refusal metadata; and
evaluating the predicate using the partial or full unprocessed results received in the response.

12. The data processing method of claim 9, wherein
the predicate refusal threshold is a partial predicate refusal threshold,
the share storage further determines a full predicate refusal threshold that is higher than the partial predicate refusal threshold, and
the method further comprises, at the shared storage:
determining that the CPU utilization of the shared storage exceeds the partial predicate refusal threshold but does not reach the full predicate refusal threshold;
upon determining that the CPU utilization of the shared storage exceeds the partial predicate refusal threshold but does not reach the full predicate refusal threshold, refraining from evaluating a portion of the predicate;
returning a response to the request including partial unprocessed results from the data for predicate evaluation; and attaching partial predicate refusal metadata to the response indicating the portion of the predicate has not been evaluated.

13. The data processing method of claim 12, further comprising, at the OLAP engine:
receiving the response including the partial unprocessed results from the data for predicate evaluation and the partial predicate refusal metadata;
determining that the portion of the predicate has not been evaluated based on the partial predicate refusal metadata; and
evaluating the predicate using the partial unprocessed results received in the response.

14. The data processing method of claim 9, wherein
the predicate refusal threshold is a partial predicate refusal threshold,
the share storage further determines a full predicate refusal threshold that is higher than the partial predicate refusal threshold, and
the method further comprises, at the shared storage:
determining that the CPU utilization of the shared storage reaches the full predicate refusal threshold;
upon determining that the CPU utilization of the shared storage reaches the full predicate refusal threshold, refraining from evaluating the predicate;
returning a response to the request including full unprocessed results from the data for predicate evaluation; and
attaching full predicate refusal metadata to the response indicating the predicate has not been evaluated.

15. The data processing method of claim 14, further comprising, at the OLAP engine:
receiving the response including the full unprocessed results from the data for predicate evaluation and the full predicate refusal metadata;
determining that the predicate has not been evaluated based on the full predicate refusal metadata; and
evaluating the predicate using the full unprocessed results received in the response.

16. The data processing method of claim 9, further comprising, at the shared storage:
determining that the CPU utilization of the shared storage does not exceed the predicate refusal threshold;
upon determining that the CPU utilization of the shared storage does not exceed the predicate refusal threshold, evaluating the predicate at the shared storage; and
returning a response to the request including full processed results from the data for predicate evaluation.

17. A hybrid transactional/analytical processing (HTAP) database, comprising:
an online transaction processing (OLTP) engine;
an online analytical processing (OLAP) engine provided separately from the OLTP engine; and
a shared storage holding data of multiple tenants, wherein the shared storage is configured to:
receive a first request from the OLAP engine for evaluation of a first predicate against the data stored on the shared storage;
determine that the CPU utilization of the shared storage exceeds the predicate refusal threshold but does not reach full predicate refusal threshold for the first request; and
upon determining that the CPU utilization of the shared storage exceeds the predicate refusal threshold but does not reach the full predicate refusal threshold, refrain from evaluating a portion of the first predicate, wherein,
the shared storage is further configured to:
receive a second request from the OLAP engine for evaluation of a second predicate against the data stored on the shared storage;
determine that the CPU utilization of the shared storage reaches the full predicate refusal threshold; and
upon determining that the CPU utilization of the shared storage reaches the full predicate refusal threshold, refrain from evaluating the second predicate.

18. The HTAP database of claim 17, wherein the shared storage is further configured to:
upon determining that the CPU utilization of the shared storage does not exceed the predicate refusal threshold, evaluate the first predicate at the shared storage.

19. The HTAP database of claim 17, wherein the shared storage is further configured to:
upon determining that the CPU utilization of the shared storage exceeds the predicate refusal threshold but does not reach the full predicate refusal threshold for the first request, return a first response to the first request including the partial unprocessed results from the data for predicate evaluation, and attach a first metadata to the first response indicating the portion of the predicate has not been evaluated; and
upon determining that the CPU utilization of the shared storage reaches the full predicate refusal threshold, return a second response to the second request including full unprocessed results from the data for predicate evaluation, and attach a second metadata to the second response indicating the predicate has not been evaluated.

20. The HTAP database of claim 19, wherein the OLAP engine is configured to:
receive the first or second response including the partial unprocessed results or the full unprocessed results from the data for predicate evaluation and the first or second metadata; and
evaluate the first or second predicate using the partial unprocessed results or the full unprocessed results received in the first or second response.

* * * * *